F. ROSE.
ARTIFICIAL TOOTH.
APPLICATION FILED NOV. 20, 1906.

936,361.

Patented Oct. 12, 1909.

UNITED STATES PATENT OFFICE.

FREDERICK ROSE, OF LIVERPOOL, ENGLAND.

ARTIFICIAL TOOTH.

936,361.  Specification of Letters Patent.  Patented Oct. 12, 1909.

Application filed November 20, 1906. Serial No. 344,236.

*To all whom it may concern:*

Be it known that I, FREDERICK ROSE, a subject of the King of England, residing at Liverpool, in the county of Lancaster, England, have invented new and useful Improvements in and Connected with Artificial Teeth, of which the following is a specification.

This invention has reference to the construction and manner or mode of mounting or fixing and supporting artificial teeth to dentures, bridges, or crowns; and it has for its objects and effects, primarily, to provide improvements in connection with such teeth, by which, in case of their fracture or replacing being necessary, new teeth can be readily fixed to the denture, bridge, or crown, as the case may be, without injuring the other teeth, or plate—metal, vulcanite, or other composition; or, in the case of a bridge, without removing it from the mouth, or damaging or hurting it or the other teeth on it, or causing serious annoyance or pain to the wearer, or in the case of crowned teeth, of damaging the root by removal of the pin or other fixing; and, at the same time, its object and effect is to enable the workman to utilize "flat" artificial teeth, such as at present exist and are generally supplied, and suited to all the various requirements of dentistry, and generally to improve dentistry as regards the fixing, mounting, and use of artificial teeth in the directions referred to, and so obviate the defects or drawbacks due to the present system of applying new teeth, or replacing broken ones, of which one, the damaging or destroying or staining of other teeth in a denture or bridge is of constant occurrence, and another is, deterioration of the strength of a denture of vulcanite, or warping of the same when affixing new teeth, or replacing others on it.

The invention will be described with reference to the accompanying drawings, which illustrate it; and the novel characteristics involved in these drawings and the following description, are set out in the claiming clauses concluding the specification.

Figure 1:
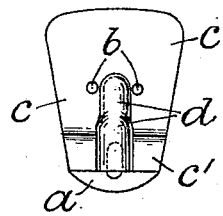
Figure 2:
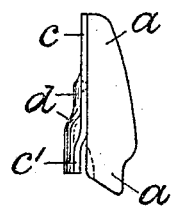
Figure 4:
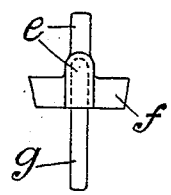
Figure 5:
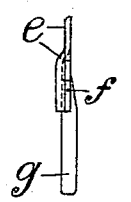
Figure 6:
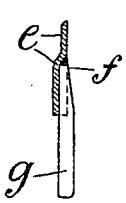
Figure 7:
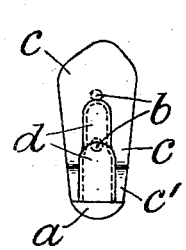
Figure 8:
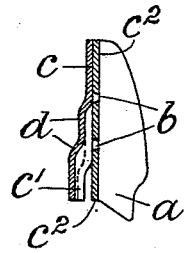
Figure 9:
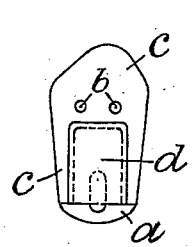

In the drawings, Figure 1 is a back view; Fig. 2 is an outside side elevation; and Fig. 3 a sectional side elevation showing a tooth constructed according to the invention. Figs. 4, 5, and 6 are back view; outside elevation; and sectional elevation of the tooth and denture support and fixing device. Figs. 7 and 8 are back view, and sectional elevation, respectively, showing the modification wherein the fastening pins or fasteners for fixing the teeth to their backing plates, are vertically in line. Fig. 9 is a back view of a tooth, and Figs. 10 and 11 respectively, front view and side view of support or fixing device showing a slightly modified construction.

Referring now to the drawings, $a$ represents the artificial tooth in all cases. To the back of this artificial tooth $a$ (referring now more particularly to Figs. 1 to 3) there is fastened by means of pins $b$, such as are now commonly employed, a plate or strip of metal $c$, which has between itself and the tooth—in itself in the case shown— a cavity or hole extending up vertically; the pins $b$, in cases, as in these figures, where they are horizontal, being one on either side of this hole or cavity, and passing through holes pierced in the plate $c$ to receive them, and riveted or soldered so as to make a good and firm fastening.

The part of the plate $c$ in which the cavity or hole referred to is provided, is marked $d$, it comprising deep and shallow cavities or grooves which are pressed out and projecting from the back of the plate, as shown. Then, in connection with the denture, bridge, or crown, as the case may be, there is employed a stem or prong device, $e$ comprising a thick and a thin portion (see Figs. 4, 5, and 6) extending from a base plate or projections $f$—of which it or they forms part,— and adapted to fit in the said hole or cavities referred to between the back of the tooth $a$ and the plate $c$; and in fitting the tooth to the denture, bridge, or crown, it is slid onto this stem or prong $e$. The thick portion may be constituted by a depression in the device as shown in Figs. 4, 5 and 6.

The lower part of the plate $c$ marked $c^1$, is provided with laterally extending recesses, that is, it is made to stand at a certain distance from the back surface of the tooth $a$ for its whole width (or it might be for the greater part of its width), and the base or stem plate or projections $f$ of the prong device is or are so forced or made that it or they fit into and fill this space or recesses beneath the lower plate portion $c^1$ when the tooth is in position.

The prong and base portion—$e$, $f$,—in the case shown are made of grooved or channel form, that is to say in a more or less semi-tubular form, this form being produced by stamping or pressing in its manufacture, by suitable dies; while the plate c itself, which is fastened to the back of the tooth, is made out of thin sheet metal of a suitable kind, with the central vertical internally grooved part d, to receive the prong e, and which corresponds internally with the form and size of the prong e, being formed by stamping it out to the shape of the prong. The lower portion of the prong base of stem plate f, at the center, is pressed out from the back, and projects therefrom in a corresponding manner to the lower portion of the part d which projects out from the lower portion $c^1$ of the plate c.

The groove of the semi-tubular stem or prong e can be filled up and made solid with metal subsequently to its manufacture, this being effected in the case shown by a solid piece or pin of metal g, the lower portion of which projects down, and serves to attach the prong device to the denture, bridge, or crown; the pin or piece g being cut away at its upper part, so as to lie flush with the inner surface of the base and prong, f and e, except at the lower part, as shown; while the upper part of the prong proper e will be filled in with solder, or the like, so that not only will the inside face of the plate c for the greater portion of its depth be flush, and lie flat on the interior surface of the tooth a when they are together, but the inside surface of the prong supporting part will be similarly flush and lie flat in a channel formed in a portion of the length of the tooth back surface. The tooth itself will be cut away at its lower inner edge, where the upper or beveled portion of the pin or piece g comes above the lower edge of the tooth.

The filling in of the prong portion e, f, as just described, and making it solid, reinforces or strengthens it; and the fastening portion g of the prong device, and its base, will be passed through a hole in, and fastened and fitted to the denture, bridge, or crown, in any suitable way. By this construction of tooth support, it is not only by the stems or prongs e proper that the tooth is held, but also by the base portion or plate f, above which the stem or prong e projects, and by this means of fixing the support, a very rigid and strong construction is furnished as well as one which will enable teeth to be replaced with ease, and without affecting the other teeth that may be carried by the denture, or the denture itself.

Figure 3:
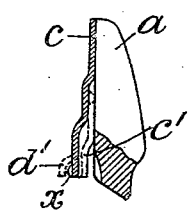

Referring now to Figs. 7 and 8, which show the construction of tooth in the case where the metal pins b are above one another, that is, vertically in line, such as would be used in the case of narrow teeth, or in any special cases, the plate c which is identical with that shown in Figs. 1 to 3, is not fastened directly to the back of the tooth a as in those figures by the pins b, but is fastened by solder or the like to a secondary plate c, which is secured to the back of the tooth by the pins b. Otherwise, there is no difference between this construction and that shown and described with reference to Figs. 1 to 3. Or, in lieu of this particular construction, for use in cases of narrow teeth such as referred to, two parallel ways or holes will be provided in the plate c, one on each side of the fastening pins b; and the carrying part or piece or prong device—which is fastened to the denture, bridge, or crown—is correspondingly provided with two stems or prongs instead of one, as shown in Figs. 4, 5 and 6, onto which the tooth slides. The teeth are fastened in position by pressing them over the prong device, either previously coated with a suitable kind of cement, e. g., oxy-chlorid or oxy-phosphate of zinc, or melting into the hole or space between the plate c and the tooth, sulfur, "fusible" metal, or the like.

Figure 10:
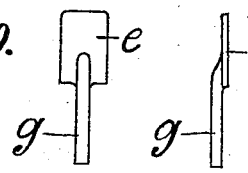
Figure 11:
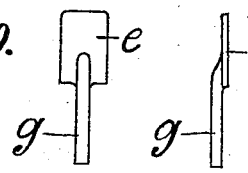

In the modification shown in Figs. 9, 10 and 11, which is particularly advantageous for use in connection with narrow teeth or for special cases, the supporting device for the tooth consists simply of a flat prong or plate e, which may be assumed to be wider than the prong portion e shown in the other figures, and narrower than the base plate f of these prong devices; and the pin or part g is fixed to this prong e similarly as above described. The pressed out or projecting portion d at the back of the tooth in this case, forming the space to receive the prong e, is simply rectangular in form, and made of a size and shape so as to receive the prong part e of the support or holder; the plate c in this case being carried down in contact with the back surface of the tooth, on each side of the part d, to the lower edge. In this case, especially if the tooth be narrow, the pins b by which the plate c is fastened to the tooth are above the projecting part d as shown; and this part and the prong part e of the support will, in most cases, be shorter than the complete prong device consisting of the parts e and f shown in Figs. 4 to 6.

In the case of bridgework, where two or more teeth are fitted on a denture, as an additional security, a bar—preferably of pin wire, analogous to that used for the pin g herein referred to—may be placed horizontally along the denture just behind the plate c of the teeth, as indicated in Fig. 3 in dotted lines, the bar being designated x; and in such a case, the lower part of the projecting portion d of the plate c will be bent out as at $d^1$, to lie over this bar x which is soldered to the base portion of the prong supports, so as to make a firm and rigid support.

In some cases, the part $c^1$ will not extend for the full width of the plate c, in which case the outer edges of this part $c^1$ will be bent in, and lie flat against the back of the tooth similarly to the other part of the plate $c$; while the part $f$ of the prong device will be made of corresponding width to fit in this space.

What is claimed is:—

1. In artificial teeth attachments, an artificial tooth, a back plate attached to the rear surface of the tooth having a cavity with parallel sides extending approximately half the length of the plate from one end; and a device comprising a portion having parallel sides and fitting into the said cavity, and a projecting pin portion.

2. In artificial teeth attachments, an artificial tooth; a back plate fixed to the back of the tooth having a deep cavity and a shallow cavity communicating with each other, and having parallel sides, and extending from one end of the plate to about the middle and centrally of the plate; and a device having a portion engaging with the said cavities, and a pin portion.

3. In artificial teeth attachments, an artificial tooth, a plate fixed to the back of the tooth having deep and shallow communicating cavities extending from one end of the plate to about the middle of its length, and centrally of the plate, said plate having laterally extending recesses on each side of the end of the cavity; and a device engaging with said cavities and said recesses, and having an outwardly projecting pin portion, substantially as described.

4. In artificial teeth attachments, an artificial tooth having a channel formed at one end in its rear face, a plate attached to the back of the tooth and having deep and shallow cavities extending from one end to about the middle thereof and centrally of the plate, said plate also having laterally extending recesses on each side of the end cavity; and a device having a portion shaped to correspond to said cavities, recesses and channel, and engaging therewith when the parts are assembled, and a projecting pin portion, substantially as described.

In testimony whereof I have signed my name to this specification in the presence of two subscribing witnesses.

FREDERICK ROSE.

Witnesses:
 L. GOODALL,
 W. HARRISON.